United States Patent
Kim

(10) Patent No.: US 8,542,476 B2
(45) Date of Patent: Sep. 24, 2013

(54) MULTILAYER CERAMIC CAPACITOR AND METHOD OF MANUFACTURING THE SAME

(75) Inventor: Hyung Joon Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 41 days.

(21) Appl. No.: 13/283,835

(22) Filed: Oct. 28, 2011

(65) Prior Publication Data

US 2012/0229951 A1 Sep. 13, 2012

(30) Foreign Application Priority Data

Mar. 9, 2011 (KR) ........................ 10-2011-0021078

(51) Int. Cl.
H01G 4/06 (2006.01)

(52) U.S. Cl.
USPC .................. 361/321.2; 361/321.1; 361/306.1; 361/306.3; 361/303; 361/305

(58) Field of Classification Search
USPC ........... 361/321.2, 303–305, 321.1, 311–313, 361/306.1, 306.3, 301.2, 301.4
See application file for complete search history.

(56) References Cited

U.S. PATENT DOCUMENTS

| | | | |
|---|---|---|---|
| 7,295,420 B2 * | 11/2007 | Kojima et al. | 361/306.3 |
| 7,298,603 B2 * | 11/2007 | Mizuno et al. | 361/303 |
| 7,319,582 B2 * | 1/2008 | Takashima et al. | 361/303 |
| 7,688,568 B1 * | 3/2010 | Lee et al. | 361/306.3 |
| 8,351,180 B1 * | 1/2013 | Ahn et al. | 361/321.2 |
| 8,400,753 B2 * | 3/2013 | Kim et al. | 361/303 |

FOREIGN PATENT DOCUMENTS

| | | |
|---|---|---|
| JP | 09-260206 A | 10/1997 |
| JP | 11-297566 A | 10/1999 |
| JP | 2000-124057 A | 4/2000 |
| JP | 2005-259772 A | 9/2005 |
| JP | 2005-303160 A | 10/2005 |
| JP | 2011-003846 A | 1/2011 |
| KR | 10-2006-0049458 A | 5/2006 |

OTHER PUBLICATIONS

Korean Office Action, and English translation thereof, issued in Korean Patent Application No. 10-2012-0048491 dated Aug. 7, 2012.
Japanese Office Action issued in JP 2011-236773, Oct. 16, 2012.
Korean Office Action, w/ English translation thereof, issued in Korean Patent Application No. 10-2011-0021078, dated Mar. 8, 2012.
Japanese Office Action, and English translation thereof, issued in Japanese Patent Application No. 2011-236773 dated Mar. 12, 2013.

* cited by examiner

*Primary Examiner* — Nguyen T Ha
(74) *Attorney, Agent, or Firm* — McDermott Will & Emery LLP

(57) ABSTRACT

The present invention relates to a multilayer ceramic capacitor and a method of manufacturing the same. The multilayer ceramic capacitor includes a ceramic body having a first side and a second side opposed to each other and having a third side and a fourth side connecting the first side to the second side; a plurality of inner electrodes formed within the ceramic body and having respective one ends exposed to the third side and the fourth side; and outer electrodes formed on the third side and the fourth side and electrically connected to the inner electrodes. A shortest distance from distal edges of an outermost inner electrode among the plurality of inner electrodes to the first side or the second side is smaller than a shortest distance from distal edges of a central inner electrode to the first side or the second side.

20 Claims, 6 Drawing Sheets

A-A'

A-A'

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2011-0021078 filed on Mar. 9, 2011, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same, and more particularly, to a high-capacity multilayer ceramic capacitor having excellent reliability and a method of manufacturing the same.

2. Description of the Related Art

Generally, electronic components using a ceramic material such as a capacitor, an inductor, a piezoelectric element, a varistor, a thermistor, or the like, include a ceramic body made of a ceramic material, inner electrodes formed within the ceramic body, and outer electrodes mounted on surfaces of the ceramic body so as to be connected to the inner electrodes.

The multilayer ceramic capacitor, among ceramic electronic components, is configured to include a plurality of stacked dielectric layers, inner electrodes disposed to be opposed to each other, having each dielectric layer therebetween, and outer electrodes electrically connected to the inner electrodes.

The multilayer ceramic capacitor has been widely used as a component of a mobile communication apparatus such as a computer, a PDA, a mobile phone, or the like, due to advantages such as miniaturization, high capacity, ease of mounting, and the like.

Recently, as electronic products have become miniaturized and multi-functional, chip parts have also tended to be miniaturized and multi-functional. As a result, there is a need to miniaturize the multilayer ceramic capacitor while increasing the capacity thereof.

In order to increase the capacity of the multilayer ceramic capacitor, a method of thinning the dielectric layers, a method of highly multilayering thinned dielectric layers, and a method of increasing a coverage of an inner electrode, or the like, have been proposed. Further, a method of increasing an overlapping area between inner electrodes forming capacity has been proposed.

Generally, the multilayer ceramic capacitor may be manufactured as follows. First, an inner electrode is formed by manufacturing a ceramic green sheet and printing a conductive paste on the ceramic green sheet. A green ceramic laminate is manufactured by multilayering the ceramic green sheets, on which the inner electrodes are formed, from several layers to several hundred layers. Thereafter, the solid green ceramic laminate is manufactured by compressing the green ceramic laminate at high temperature and high pressure and the solid green ceramic laminate is subjected to a cutting process to manufacture green chips. Thereafter, the multilayer ceramic capacitor is completed by plasticizing and firing the green chip and then, forming the outer electrodes thereon.

When the multilayer ceramic capacitor is formed by the above-mentioned manufacturing method, it is difficult to minimize an area of a margin portion of the dielectric layer on which the inner electrodes are not formed and thus, there is a limitation in increasing the overlapping area of the inner electrodes. Further, a margin portion of a corner portion of the multilayer ceramic capacitor is formed to be thicker than a margin portion of the other area thereof, such that it is not easy to remove carbon therefrom at the time of the plasticizing and firing.

SUMMARY OF THE INVENTION

An object of the present invention provides a high-capacity multilayer ceramic capacitor having excellent reliability and a method of manufacturing the same.

According to an exemplary embodiment of the present invention, there is provided a multilayer ceramic capacitor, including: a ceramic body having a first side and a second side opposed to each other and having a third side and a fourth side connecting the first side to the second side; a plurality of inner electrodes formed within the ceramic body and having respective one ends exposed to the third side and the fourth side; and outer electrodes formed on the third side and the fourth side and electrically connected to the inner electrodes, wherein a shortest distance from distal edges of an outermost inner electrode among the plurality of inner electrodes to the first side or the second side is smaller than a shortest distance from distal edges of a central inner electrode to the first side or the second side.

The shortest distance from the distal edges of the outermost inner electrode, among the plurality of inner electrodes, to the first side or the second side may be 2 to 10 μm.

A shortest distance from distal edges of a top outermost inner electrode to the first side and a shortest distance from distal edges of a bottom outermost inner electrode to the second side, among the plurality of inner electrodes are both set to be 2 to 10 μm.

The shortest distance from distal edges of the central inner electrode, among the plurality of inner electrodes, to the first side or the second side may be 30 μm or less.

The shortest distance from distal edges of the central inner electrode, among the plurality of inner electrodes, to the first side or the second side may be 10 μm to 20 μm.

The ceramic body may be configured to include the ceramic body includes a multilayer body in which a plurality of dielectric layers having a length forming a distance between the third side and the fourth side of the ceramic body and a width the same as that of the inner electrodes are stacked, and a first side member and a second side member forming the distance from the distal edges of the inner electrodes to the first side or the second side of the ceramic body.

The first side member and the second side member may be made of ceramic slurry.

The inner electrodes may be configured to include a first inner electrode of which one end is exposed to the third side and the other end is formed to be spaced apart from the fourth side by a predetermined distance and a second inner electrode of which one end is exposed to the fourth side and the other end is formed to be spaced apart from the third side by a predetermined distance.

According to another exemplary embodiment of the present invention, there is provided a multilayer ceramic capacitor, including a multilayer body, first and second side members formed on the first and second sides of the multilayer body, respectively, and outer electrodes formed on the third side and the fourth side to be electrically connected to the inner electrodes. The multilayer body includes a plurality of inner electrodes. The multilayer body has a first side and a second side opposed to each other and has a third side and a fourth side connecting the first side to the second side. A width of a portion of the first side member or the second side member in contact with an outermost inner electrode is smaller than a width of a portion of the first side member or the second side member in contact with a central inner electrode.

The first side member and the second side member may be individually formed from the multilayer body.

The first side member and the second side member may be made of ceramic slurry.

According to another exemplary embodiment of the present invention, there is provided a method of manufacturing a multilayer ceramic capacitor, including: preparing a first ceramic green sheet on which a plurality of stripe-type first inner electrode patterns are formed to be spaced apart from one another by a predetermined distance and a second ceramic green sheet on which a plurality of stripe-type second inner electrode patterns are formed to be spaced apart from one another by a predetermined distance; forming a ceramic green sheet laminate by stacking the first ceramic green sheet and the second ceramic green sheet such that the stripe type first inner electrode patterns and the stripe type second inner electrode patterns are intersected; cutting a ceramic green sheet laminate to traverse the stripe-type first inner electrode patterns and second inner electrode patterns, to allow first inner electrodes and second inner electrodes to have a predetermined width, and to allow the ceramic green sheet laminate to have sides to which distal edges of the first inner electrodes and the second inner electrodes are exposed in a width direction thereof; and forming a first side member and a second side member made of ceramic slurry on the sides to which the distal edges of the first inner electrodes and the second inner electrodes are exposed and making the width of the first or second side member contacting distal edges of an outermost inner electrode to be less than the width of the first or second side member contacting distal edges of a central inner electrode among the plurality of first and second inner electrodes.

The forming of the ceramic green sheet laminate may be performed such that a central portion of each of the stripe-type first inner electrode patterns and a predetermined distance between the stripe-type second inner electrode patterns overlap with each other.

The cutting of the ceramic green sheet laminate may include cutting the ceramic green sheet laminate into bar-type laminates, each bar-type laminate having sides to which the distal edges of the first inner electrodes and the second inner electrodes are exposed, and after the forming of the first and second side members, cutting the ceramic green sheet into multilayer bodies, each multilayer body having a third side and a fourth side to which respective one ends of the first inner electrodes and the second inner electrodes are exposed by cutting the central portion of each of the first inner electrodes and a predetermined distance between the second inner electrodes along the same cutting line.

The cutting of the ceramic green sheet laminate may be performed by cutting the ceramic green sheet into bar-type laminates, each bar-type laminate having sides to which the distal edges of the first inner electrodes and the second inner electrodes are exposed, and cutting the bar-type laminate into multilayer bodies, each multilayer body having a third side and a fourth side to which respective one ends of the first inner electrodes and the second inner electrodes are exposed by cutting the central portion of each of the first inner electrodes and a predetermined distance between the second inner electrodes along the same cutting line; and the forming of the first and second side members may be performed on the multilayer body.

The forming of the first side member and the second side member may be performed by applying ceramic slurry to the sides to which the distal edges of the first inner electrodes and the second inner electrodes are exposed.

The forming of the first side member and the second side member may be performed by dipping the sides to which the distal edges of the first inner electrodes and the second inner electrodes are exposed in ceramic slurry.

The width of the first or second side member contacting the distal edges of the outermost inner electrode, among the plurality of first and second inner electrodes may be set to be 2 to 10 μm and the width of the first or second side member contacting the distal edges of the central inner electrode, among the plurality of first and second inner electrodes may be set to be 30 μm or less, by controlling the amount of ceramic slurry.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
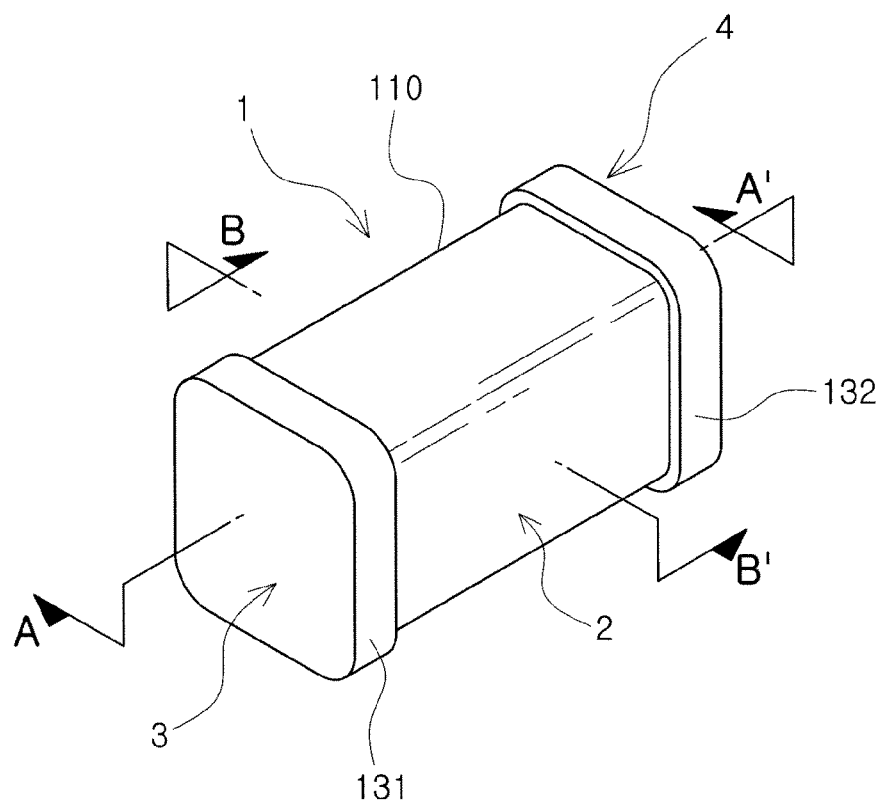
FIG. 1A is a schematic perspective view of a multilayer ceramic capacitor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and sizes of components are exaggerated for clarity. The same or equivalent elements are referred to by the same reference numerals throughout the specification.

Figure 1B:
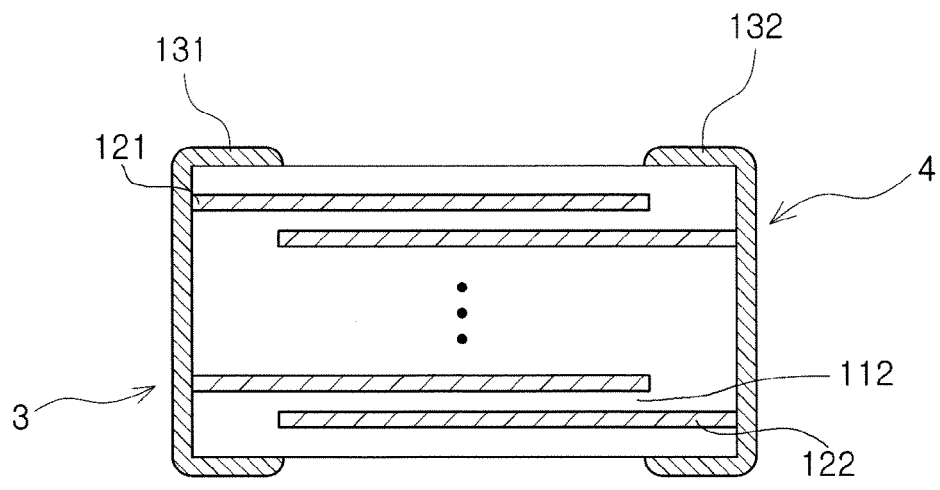
FIG. 1B is a cross-sectional view of the multilayer ceramic capacitor taken along line A-A' of FIG. 1A.
Figure 1C:
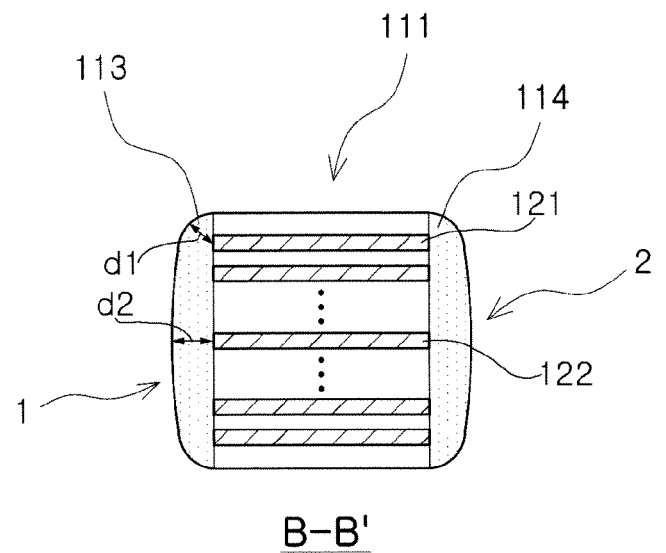
FIG. 1C is a cross-sectional view of the multilayer ceramic capacitor taken along line B-B' of FIG. 1A, and FIGS. 1D and 1E are top plan views of the multilayer ceramic capacitor showing one dielectric layer constituting the multilayer ceramic capacitor shown in FIG. 1A.
Figure 1D:
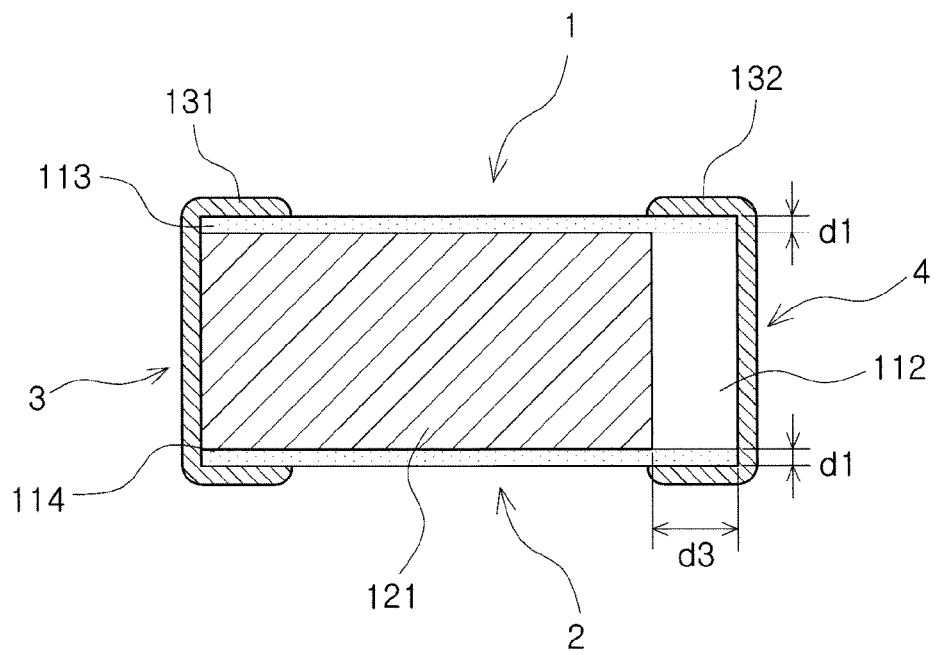
Figure 1E:
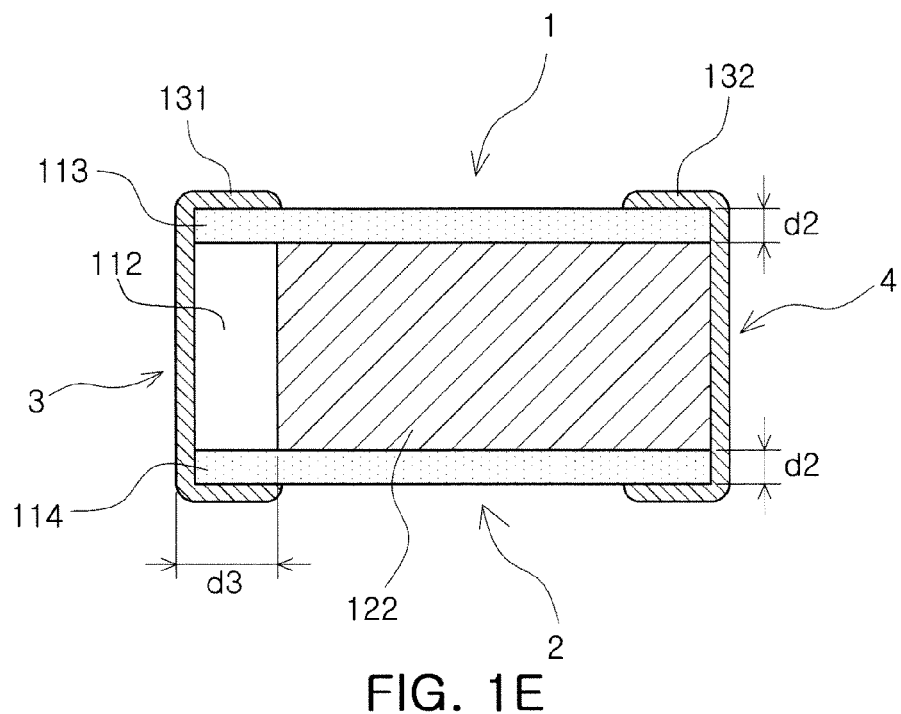

FIG. 1A is a schematic perspective view of a multilayer ceramic capacitor according to an exemplary embodiment of the present invention. FIG. 1B is a cross-sectional view of the multilayer ceramic capacitor taken along line A-A' of FIG. 1A. FIG. 1C is a cross-sectional view of the multilayer ceramic capacitor taken along line B-B' of FIG. 1A. FIGS. 1D and 1E are top plan views of the multilayer ceramic capacitor showing one dielectric layer constituting the multilayer ceramic capacitor shown in FIG. 1A.

Referring to FIGS. 1A through 1E, the multilayer ceramic capacitor according to the exemplary embodiment of the present invention is configured to include a ceramic body 110, a plurality of inner electrodes 121 and 122 formed within the ceramic body, and outer electrodes 131 and 132 formed on outer surfaces of the ceramic body.

The ceramic body 110 may have a first side 1 and a second side 2 to be opposed to each other and a third side 3 and a fourth side 4 connecting the first side to the second side.

The shape of the ceramic body 110 is not particularly limited, but it may be a rectangular parallelepiped shape having first to fourth sides as shown in FIG. 1.

The plurality of inner electrodes 121 and 122 formed within the ceramic body 110 have respective one ends exposed to the third side 3 and the fourth side 4 of the ceramic body in a longitudinal direction.

The inner electrodes 121 and 122 may be a pair of a first inner electrode 121 and a second inner electrode 122 having different polarities. One end of the first inner electrode 121 may be exposed to the third side 3 and one end of the second inner electrode 122 may be exposed to the fourth side 4. The other ends of the first inner electrode 121 and the second inner electrode 122 may be formed to be spaced apart from the third side 3 or the fourth side 4 by a predetermined distance d3. A detailed description thereof will be described below.

The third side 3 and the fourth side 4 of the ceramic body may have the first and second outer electrodes 131 and 132 formed thereon to be electrically connected to the inner electrodes.

A shortest distance d1 from the distal edges of the outermost inner electrode among the plurality of inner electrodes formed within the ceramic body to the first side or the second side may be smaller than a shortest distance d2 from the distal edges of the central inner electrode to the first side or the second side.

The distal edge of the inner electrode, which refers to a part of the inner electrode toward the first side 1 or the second side 2 of the ceramic body, implies one edge in a width direction of the inner electrode. An area from the distal edges of the inner electrodes to the first side or the second side may be referred to as a first side member 113 or a second side member 114.

According to the exemplary embodiment of the present invention, the ceramic body 110 may include a multilayer body 111 in which a plurality of dielectric layers 112 are stacked and a first side member 113 and a second side member 114 formed on both sides of the multilayer body. The first side member 113 and the second side member 114 may be individually formed from the multilayer body 111. In this case, the distance from respective distal edges of the plurality of inner electrodes to the first side or the second side may be formed by the first side member 113 and the second side member 114.

The distances d1 and d2 from respective distal edges of the inner electrodes to the first side and the second side may be referred to as widths of the first side member 113 and the second side member 114. As described above, the width of the first side member 113 or the second side member 114 may not be constant from the top to the bottom thereof. For example, a width d1 of a portion of the side member in contact with the outermost inner electrode among the plurality of inner electrodes may be relatively narrow and a width d2 of a portion of the side member in contact with the central inner electrode may be relatively wide. That is, the width d1 of the portion of the first side member 113 or the second side member 114 in contact with the outermost inner electrode may be smaller than the width d2 of the portion of the first side member 113 or the second side member 114 in contact with the central inner electrode. A more detailed description thereof will be described below.

The plurality of dielectric layers 112 constituting the multilayer body 111, is in a sintered state, and may be integrated such that a boundary between adjacent dielectric layers may not be readily apparent.

The length of the multilayer body 111 corresponds to the length of the ceramic body 110 and the length of the ceramic body 110 corresponds to the distance from the third side 3 to the fourth side 4 of the ceramic body. That is, the third and fourth sides of the ceramic body 110 may be considered to be the third side and the fourth side of the multilayer body 111.

The multilayer body 111 is formed by stacking the plurality of dielectric layers 112 and the length of the dielectric layers 112 forms a distance between the third side 3 and the fourth side of the ceramic body.

Although not limited thereto, according to the exemplary embodiment of the present invention, the length of the ceramic body may be 400 to 1400 µm. In more detail, the length of the ceramic body may be 400 to 800 µm or 600 to 1400 µm.

The inner electrodes 121 and 122 may be formed on the dielectric layers and the inner electrodes 121 and 122 may be formed within the ceramic body by the sintering, while having each dielectric layer therebetween. The inner electrodes 121 and 122 may be formed as a pair of the first and second inner electrodes 121 and 122 having different polarities and may be disposed to be opposed to each other along the stacking direction of the dielectric layer.

Referring to FIGS. 1D and 1E, the first inner electrode 121 is formed on one dielectric layer 112 and the second inner electrode 122 is formed on another dielectric layer 112. The first inner electrode 121 and the second inner electrode 122 are not formed on the entirety of the longitudinal direction of the dielectric layer. That is, one end of the first inner electrode 121 may be formed up to the third side 3 to be exposed to the third side 3 and the other end of the first inner electrode 121 may be formed to be spaced apart from the fourth side 4 of the ceramic body by a predetermined distance d3.

The one end of the first inner electrode exposed to the third side 3 of the multilayer body is connected to the first outer electrode 131.

One end of the second inner electrode 122 is exposed to the fourth side 4 to be connected to the second outer electrode 132 and the other end of the second inner electrode 122 is formed to be spaced apart from the third side 3 by the predetermined distance d3.

The width of the dielectric layer 112 may be equal to the widths of the first and second inner electrodes 121 and 122. That is, the first and second inner electrodes 121 and 122 may be entirely formed across the width of the dielectric layer 112. The width of the dielectric layer and the widths of the inner electrodes are based on the first and the second sides of the ceramic body.

Although not limited thereto, according to the exemplary embodiment of the present invention, the width of the dielectric layer and the widths of the inner electrodes may be 100 to 900 µm. In more detail, the width of the dielectric layer and the widths of the inner electrodes may be 100 to 500 µm or 100 to 900 µm.

According to the exemplary embodiment of the present invention, although the inner electrodes and the dielectric layer are thinly formed, the inner electrodes are entirely formed across the width of the dielectric layer to increase the overlapping area between the inner electrodes, thereby increasing the capacity of the multilayer ceramic capacitor. In addition, the multilayer ceramic capacitor with excellent reliability while having the excellent capacity characteristics may be provided by reducing steps due to the inner electrodes so as to improve the lifespan of the insulation resistance.

In the exemplary embodiment of the present invention, the width of the inner electrodes is equal to the width of the dielectric layer, such that the distal edges of the inner electrodes may be exposed to the first and second sides of the multilayer body. The first side member 113 and the second side member 114 may be respectively formed on both sides of the multilayer body 111 to which the distal edges of the inner electrodes are exposed. Accordingly, the first side member 113 and the second side member 114 may be formed to be the first side and the second side of the ceramic body 110. The first side member 113 and the second side member 114 may be individually formed from the multilayer body 111.

As described above, the width of the first side member 113 or the second side member 114 may not be constant from the top to the bottom thereof.

That is, the width d1 of the portion of the first side member 113 or the second side member 114 in contact with the outermost inner electrode may be smaller than the width d2 of the portion of the first side member 113 or the second side member 114 in contact with the central inner electrode. Accordingly, the shortest distance d1 from the distal edges of the outermost inner electrode among the plurality of inner electrodes formed within the ceramic body to the first side or the second side may be smaller than the shortest distance d2 from the distal edges of the central inner electrode to the first side or the second side.

In the exemplary embodiment of the present invention, the outermost inner electrode is set as the first inner electrode 121 (hereinafter, referred to as 'the outermost first inner electrode') and the central inner electrode is set as the second inner electrode 122 (hereinafter, referred to as 'the central second inner electrode'). However, the present invention is not limited thereto.

FIG. 1D is a top plan view showing the outermost first inner electrode 112 in the multilayer body and FIG. 1F is a top plan view showing the central second inner electrode 122 in the multilayer body. In the exemplary embodiment of the present invention, the central internal electrode may refer to an internal electrode which is not the outermost internal electrode among the plurality of inner electrodes. Alternatively, the central internal electrode may refer to an internal electrode which is not the outermost internal electrode and refer to the inner electrode contacting the part of the first or the second side member at which the width thereof is largest.

The shortest distance d1 from the outermost first inner electrode 121 among the plurality of inner electrodes to the first side may be 2 μm or more. Further, the shortest distance d1 from the outermost first inner electrode 121 to the second side may be 2 μm or more. In addition, the shortest distance d1 may be 10 μm or less.

When the shortest distance d1 is less than 2 μm, the moisture resistance characteristics of the multilayer ceramic capacitor may be degraded and radiating cracks may occur at the time of forming the outer electrodes. In addition, when the shortest distance d1 exceeds 10 μm, it may be difficult to remove the residual carbon during the plasticizing and firing processes of the multilayer body, thereby degrading the connectivity of the inner electrodes.

Further, the above-mentioned characteristics may be applied to both of the top and bottom outermost inner electrodes.

In this case, the thickness of four corner portions of the ceramic body may be 2 to 10 μm.

The shortest distance d2 from the distal edge of the central second inner electrode 122 among the plurality of inner electrodes to the first side may be 30 μm or more. Further, the shortest distance d2 from the distal edge of the central second inner electrode to the second side may be 30 μm or less. More preferably, the shortest distance d2 may be 10 to 20 μm.

When the shortest distance d2 is short, mechanical strength against external impacts may be degraded. In addition, when the shortest distance d2 exceeds 30 μm, the overlapping area between the inner electrodes is relatively reduced, such that securing the high-capacity multilayer ceramic capacitor may be difficult.

According to the exemplary embodiment of the present invention, the distances d1 and d2 from the distal edges of the inner electrode to the first side or the second side may be small, whereby the overlapping area between the inner electrodes formed within the ceramic body may be relatively wide.

Further, the shortest distance d1 from an inner electrode disposed at the corner portion at which it is relatively difficult to remove the residual carbon, that is, the outermost inner electrode to the first side or the second side may be very short, whereby the removing of the residual carbon may be facilitated. Therefore, the concentration distribution of the residual carbon become smaller, thereby maintaining the same fine structure and improving the connectivity of the inner electrodes.

Further, internal defects do not occur and the possible occurrence of radiating cracks at the time of forming the outer electrodes may be reduced, by controlling the shortest distance from the distal edges of the outermost inner electrode to the first side or the second side and the distance from the distal edges of the central inner electrode to the first side or the second side.

The exemplary embodiment of the present invention may allow for the manufacturing of the multilayer ceramic capacitor having excellent reliability by improving the moisture resistance and the insulation resistance characteristics of the multilayer ceramic capacitor while maximizing the capacity thereof.

According to the exemplary embodiment of the present invention, the first side member 113 and the second side member 114 may be made of ceramic slurry. The widths of the first side member 113 and the second side member 114 may be controlled by controlling the amount of ceramic slurry. The widths of the side members contacting the outermost inner electrode and the widths of the side members contacting the central inner electrode may be easily controlled.

Hereinafter, a method of manufacturing a multilayer ceramic capacitor according to the exemplary embodiment of the present invention will be described below.

FIGS. 2A through 2F are cross-sectional views and perspective views schematically showing a method of manufacturing a multilayer ceramic capacitor according to an exemplary embodiment of the present invention.

Figure 2A:
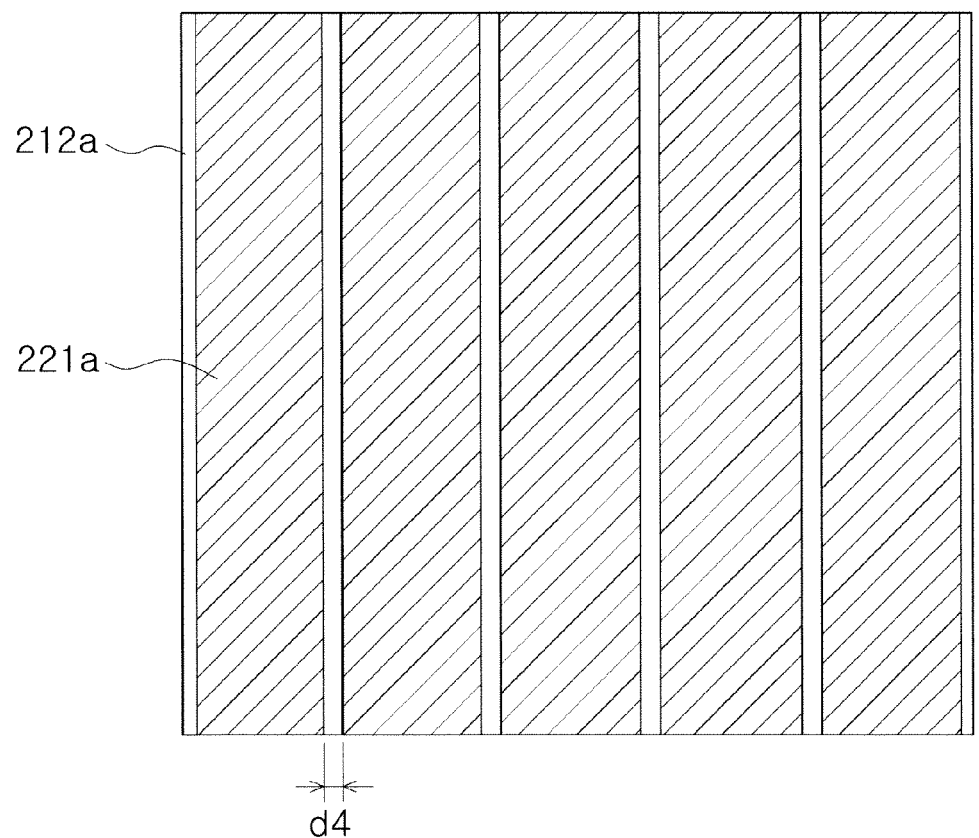
FIGS. 2A through 2F are cross-sectional views and perspective views schematically showing a method of manufacturing a multilayer ceramic capacitor according to an exemplary embodiment of the present invention.

First, as shown in FIG. 2A, a plurality of stripe-type first inner electrode patterns 221a may be formed on a ceramic green sheet 212a to be spaced apart from one another by a predetermined distance d4. The plurality of stripe-type first inner electrode patterns 221a may be formed in parallel with one another.

The predetermined distance d4 is a distance to allow the inner electrodes to be insulated from the outer electrodes having different polarities and may be considered as a distance of d3×2 shown in FIG. 1D.

The ceramic green sheet 212a may be made of ceramic paste including a ceramic powder, an organic solvent, and an organic binder.

The ceramic powder is a material having high permittivity, but is not limited thereto. A barium titanate ($BaTiO_3$) material, a lead complex Perovskite material, a strontium titanate ($SrTiO_3$) material, or the like, may be used, preferably, a barium titanate ($BaTiO_3$) powder may be used. When the ceramic green sheet 212a having the plurality of stripe-type first inner electrode patterns 221a formed thereon is fired, it may become a dielectric layer constituting the ceramic body.

The stripe-type first inner electrode patterns 221a may be made of the inner electrode paste including a conductive metal. The conductive metal is not limited thereto, but may be Ni, Cu, Pd, or an alloy thereof.

A method of forming the stripe-type first inner electrode pattern 221a on the ceramic green sheet 212a is not particularly limited, but may be formed by, for example, a printing method such as a screen printing method or a gravure printing method.

Further, although not shown, a plurality of stripe-type second inner electrode patterns 222a may be formed on another ceramic green sheet 212a by a predetermined distance.

Hereinafter, the ceramic green sheet on which the first inner electrode patterns 221a are formed may be referred to as the first ceramic green sheet and the ceramic green sheet on which the second inner electrode patterns 222a are formed may be referred to as the second ceramic green sheet.

Figure 2B:
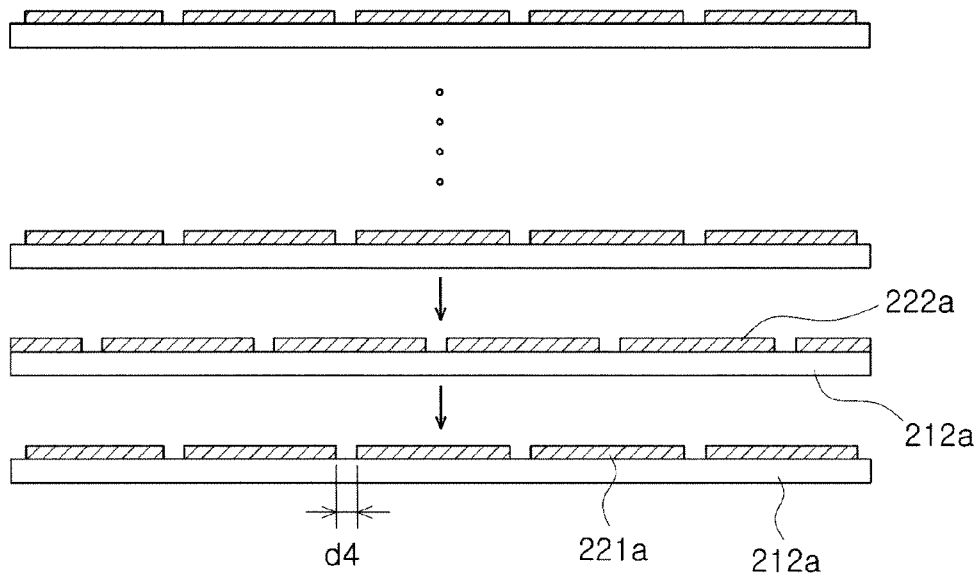

Next, as shown in FIG. 2B, the first and second ceramic green sheets may be alternately stacked such that the stripe-type first inner electrode patterns 221a and the stripe-type second inner electrode patterns 222a are alternately stacked.

Thereafter, each stripe-type first inner electrode pattern 221a may form the first inner electrode 221 and each stripe-type second inner electrode pattern 222a may form the second inner electrode 222.

Figure 2C:
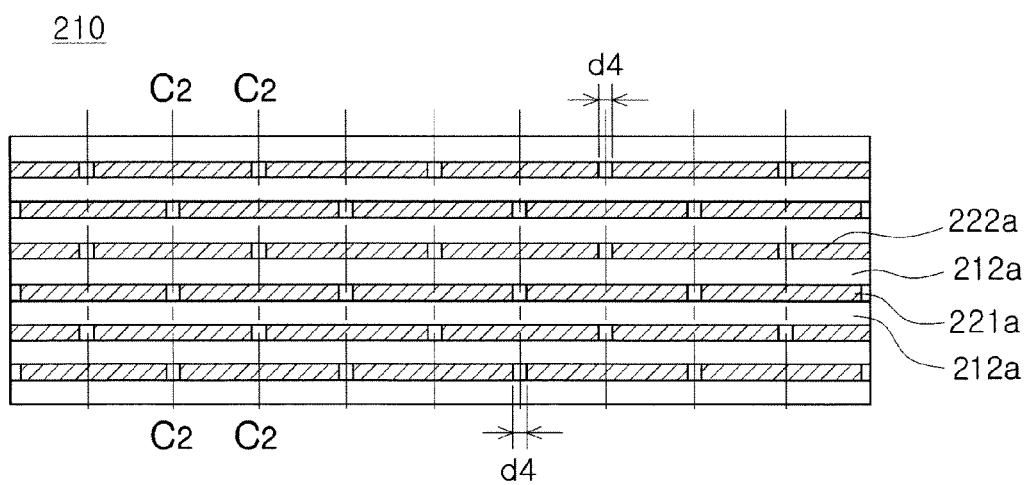
Figure 2D:
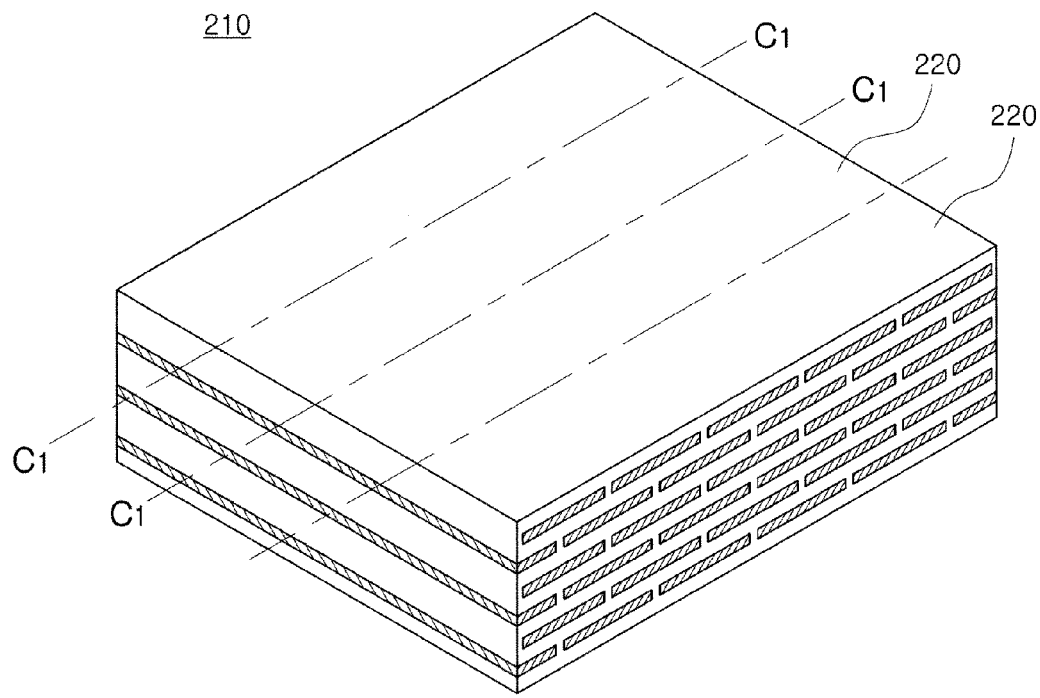

FIG. 2C is a cross-sectional view of a ceramic green sheet laminate 210 on which the first and second ceramic green sheets are stacked according to the exemplary embodiment of the present invention and FIG. 2D is a perspective view of the ceramic green sheet laminate 210 on which the first and second ceramic green sheets are stacked.

Referring to FIGS. 2C and 2D, the first ceramic green sheet on which the plurality of parallel stripe-type first inner electrode patterns 221a are printed and the second ceramic green sheet on which the plurality of parallel stripe-type second inner electrode patterns 222a are printed are alternately stacked.

In more detail, the first ceramic green sheet and the second ceramic green sheet are stacked in such a manner that the central portion of the stripe-type first inner electrode pattern 221a printed on the first ceramic green sheet and the distance d4 between the stripe-type second inner electrode patterns 222a printed on the second ceramic green sheet overlap with each other.

Next, as shown in FIG. 2D, the ceramic green sheet laminate 210 may be cut so as to traverse the plurality of stripe-type first inner electrode patterns 221a and the plurality of stripe-type second inner electrode patterns 222a. That is, the ceramic green sheet laminate 210 may be cut into bar-type laminates 220 along cutting line C1-C1.

In more detail, the stripe-type first inner electrode patterns 221a and the stripe-type second inner electrode patterns 222a may be cut in a longitudinal direction to be divided into a plurality of inner electrodes having a constant width. In this case, the stacked ceramic green sheets are cut together with the inner electrode patterns. As a result, dielectric layers having the same width as the width of the inner electrodes may be formed.

The distal edges of the first and second inner electrodes may be exposed to the cut surfaces of each of the bar-type laminates 220. The cut surfaces of the bar-type laminate 220 may each be referred to as the first side and the second side of the bar-type laminate.

Figure 2E:
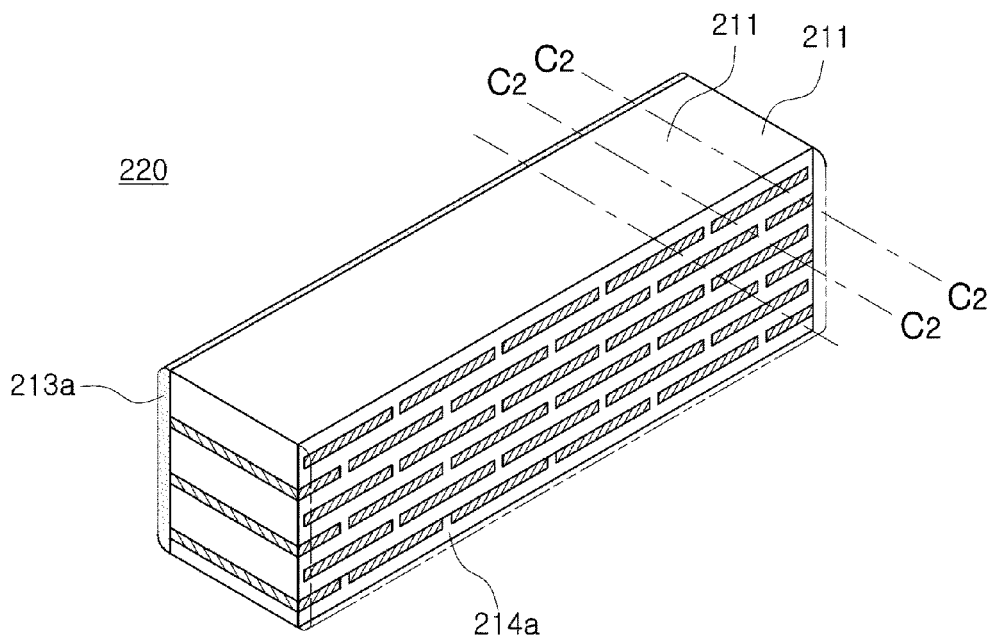

Next, as shown in FIG. 2E, the first side and second sides of the bar-type laminate 220 may each be provided with a first side member 213a and a second side member 214a. The second side member 214a is not clearly shown and the contour thereof is shown as a dotted line.

The first and second sides of the bar-type laminate 220 may be considered to correspond to the first side and the second side of the multilayer body 111 shown in FIG. 1C.

The first and second side members 213a and 214a may be made of ceramic slurry containing a ceramic powder in the bar-type laminate 220. The ceramic slurry may include a ceramic powder, an organic binder, and an organic solvent.

The amount of the ceramic slurry may be controlled such that the first and second side members 213a and 214a have the desired thickness (or width).

The first and second side members 213a and 214a may be formed by applying the ceramic slurry to the first and second sides of the bar-type laminate 220. A method of applying the ceramic slurry is not particularly limited and therefore, the ceramic slurry may be sprayed by a spray method or may be applied using a roller.

In addition, the first and second sides of the bar-type laminate may be dipped in the ceramic slurry to have the first and second side members 213a and 214a formed thereon.

As described above, the width of the first side member contacting the distal edge of the outermost inner electrode among the plurality of stacked inner electrodes may be formed to be smaller than that of the first side member contacting the distal edge of the central inner electrode.

In detail, the width of the first side member contacting the distal edge of the outermost inner electrode may be 2 µm or less. In addition, the width of the second side member contacting the distal edge of the outermost inner electrode may be 2 µm or less.

In addition, the width of the first side member contacting the distal edge of the central inner electrode may be 30 µm or less. In addition, the width of the second side member contacting the distal edge of the central inner electrode may be 30 µm or less. More preferably, the widths of the first and second side potions may be 10 to 20 µm.

Figure 2F:
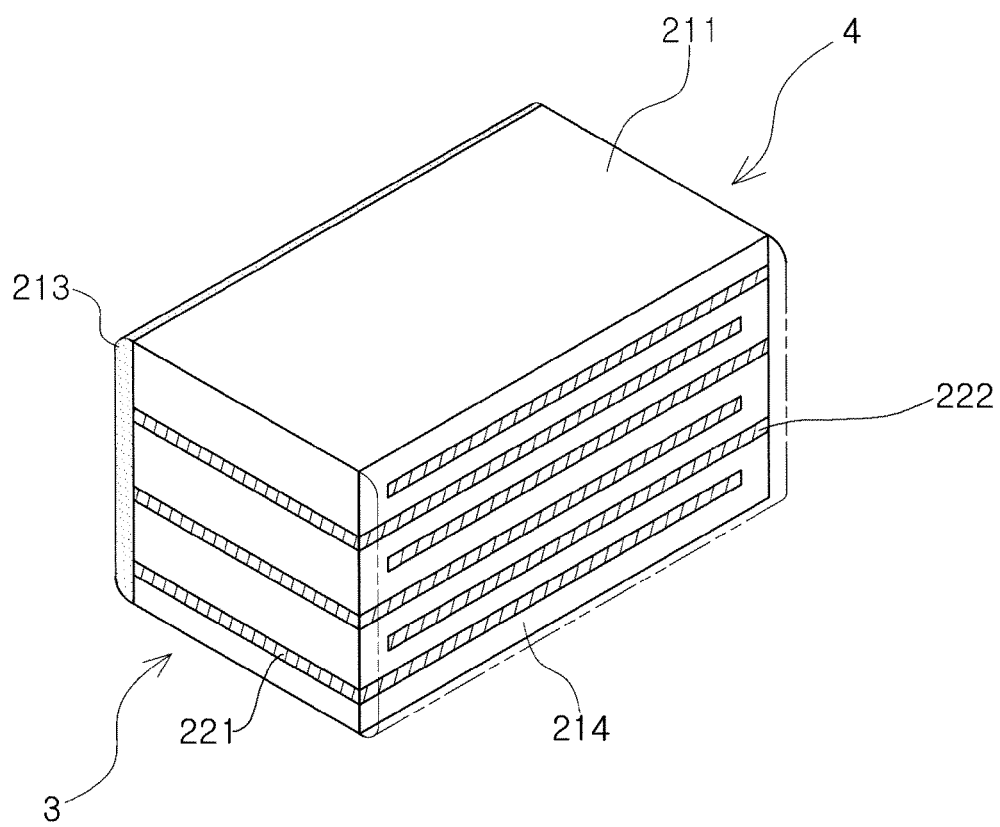

Next, as shown in FIGS. 2E and 2F, the bar-type laminate 220 provided with the first and second side members 213a and 214a may be cut along cutting line C2-C2 to correspond to the individual chip size. FIG. 2C may be referenced to determine a position of cutting line C2-C2.

The bar-type laminate 220 is cut into chip sized fragments, thereby forming individual ceramic bodies each having a multilayer body 211 and first and second side members 213 and 214 formed on both sides of the multilayer body.

As the bar-type laminate 220 is cut along cutting line C2-C2, the overlapped central portion of the first inner electrode and the predetermined distance d4 formed between the second inner electrodes may be cut along the same cutting line, that is, line C2-C2. Alternatively, the central portion of the second inner electrode and a predetermined distance between the first inner electrodes may be cut along the same cutting line.

Therefore, one ends of the first inner electrode and the second inner electrode may be alternately exposed to cut surfaces along cutting line C2-C2. The surface to which the first inner electrode 221 is exposed may be considered to be the third side 3 of the multilayer body shown in FIGS. 1D and 1F and the surface to which the second inner electrode 222 is exposed may be considered to be the fourth side 4 of the multilayer body shown in FIGS. 1D and 1F.

As the bar-type laminate 220 is cut along cutting line C2-C2, the predetermined distance d4 between the stripe-type first inner electrode patterns 221a is cut half, whereby one end of the first inner electrode 221 may form the predetermined distance d2 from the fourth side. In addition, the second inner electrode 222 may form a predetermined distance from the third side.

Thereafter, the multilayer body 211 of which both sides are provided with the first and second side members 213 and 214 may be plasticized and fired.

Next, the third side and the fourth side may be provided with the outer electrodes to be connected to one ends of the first and second inner electrodes.

In addition, the first and second side members may be plasticized and fired after being formed on both sides of the bar-type laminate and then the bar-type laminate may be cut into multilayer body shapes. Thereafter, a process of forming outer electrodes on the multilayer body may be performed.

According to the exemplary embodiment of the present invention, when the bar-type laminate 220 has the first and second side members formed thereon and then is cut into chip sized fragments, a plurality of the multilayer bodies 111 may have the side members formed thereon by one-time process.

In addition, although not shown, before forming the first side member and the second side member, the bar-type laminate may be cut into chip sized fragments to form the plurality of multilayer bodies.

That is, the bar-type laminate may be cut in such a manner that the central portion of the first inner electrode and the predetermined distance formed between the second inner electrodes that overlap with each other are cut along the same cutting line. Therefore, one ends of the first inner electrodes and the second inner electrodes may be alternately exposed to the cut surface.

Thereafter, the first and second sides of the multilayer body may have the first side member and the second side member formed thereon. The method of forming the first and second side members will be described above. The multilayer body having the first side member and the second side member formed thereon may be plasticized and fired.

Thereafter, the third side of the multilayer body to which the first inner electrode is exposed and the fourth side of the multilayer body to which the second inner electrode is exposed may each have the outer electrodes formed thereon.

According to the exemplary embodiment of the present invention, the distal edges of the first and second inner electrodes are exposed through the first and second sides of the multilayer body. The plurality of stacked first and second inner electrodes are simultaneously cut, such that the distal edge of the inner electrode may be disposed on a straight line. Thereafter, the first and second sides of the multilayer body may be provided with the first side member and the second side member. The ceramic body is formed to include the multilayer body and the first and second side members. That is, the first and second side members form the first and second sides of the ceramic body.

According to the exemplary embodiment of the present invention, the first and second side members may be made of ceramic slurry and the widths of the side members may be easily controlled by controlling the amount of ceramic slurry.

As described above, the widths of the first and second side members contacting the distal edges of the outermost inner electrode among the plurality of stacked inner electrodes may be smaller than those of the first and second side members contacting the distal edges of the central inner electrode.

According to the exemplary embodiment of the present invention, the widths of the first and second side members contacting the distal edges of an internal electrode at the corner portions of the ceramic body at which it is difficult to remove the residual carbon, that is, the outermost internal electrode may be very small, whereby the removing of the residual carbon may be faciliated. Therefore, the concentration distribution of the residual carbon become smaller, thereby maintaining the same fine structure and improving the connectivity of the inner electrodes.

In addition, the widths of the first and second side members contacting the distal edges of the outermost inner electrode may be formed to be 2 μm or more, thereby securing the moisture resistance characteristics so as not to cause internal defects and reducing the possible occurrence of radiating cracks at the time of forming the outer electrode.

In addition, the widths of the first and second side members contacting the distal edges of the central inner electrode among the plurality of stacked inner electrodes may be formed to be larger than those of the first and second side members contacting the distal edges of the outermost inner electrode, thereby securing mechanical strength against external impacts.

In addition, the widths of the first and second side members contacting the distal edges of the central inner electrode may be less than 30 μm, thereby allowing the overlapping area between inner electrodes to be relatively wide.

Further, the inner electrodes may be entirely formed across the width of the dielectric layer, excepting for the minimum area on the dielectric layer to maintain the insulation from the outer electrodes having different polarities. Therefore, forming the overlapping area between the inner electrodes may be faciliated and the occurrence of steps due to the inner electrode may be reduced.

Accordingly, the multilayer ceramic capacitor according to the exemplary embodiment of the present invention may have excellent reliability by improving the moisture resistance and the insulation resistance characteristics while maximizing the capacity thereof.

As set forth above, the exemplary embodiment of the present invention may shorten the distance from the distal edges of the inner electrode to the first side or the second side in the multilayer ceramic capacitor. Therefore, the overlapping area between the inner electrodes formed in the ceramic body may be relatively widened.

Further, the distance from the distal edges of the inner electrode disposed at the corner portions of the ceramic body at which it is relatively difficult to remove the residual carbon, that is, the outermost inner electrode to the first side or the second side may be very small, whereby the removing of the residual carbon may be faciliated. Therefore, the concentration distribution of the residual carbon become smaller, thereby maintaining the same fine structure and improving the connectivity of the inner electrodes.

Further, the shortest distance from the distal edges of the outermost inner electrode to the first side or the second side is secured as a predetermined thickness, thereby allowing for securing the moisture resistance characteristics of the capacitor and reducing the internal defects thereof. Further, the possible occurrence of radiating cracks may be reduced and mechanical strength against external impacts may be secured at the time of forming the outer electrode.

According to the exemplary embodiment of the present invention, the plurality of stacked first and second inner electrodes and the ceramic green sheet may be simultaneously cut such that the distal edges of the inner electrodes on a straight line. Thereafter, the first and second side members may be formed on surfaces to which the distal edges of the inner electrodes are exposed. The widths of the side members may be easily controlled depending on the amount of ceramic slurry used therein.

The inner electrode may be entirely formed across the width of the dielectric layer, whereby the overlapping area between the inner electrodes may be easily formed and the occurrence of the steps due to the inner electrodes may be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic capacitor, comprising:
a ceramic body having a first side and a second side opposed to each other and having a third side and a fourth side connecting the first side to the second side;
a plurality of inner electrodes formed within the ceramic body and having respective one ends exposed to the third side and the fourth side; and
outer electrodes formed on the third side and the fourth side and electrically connected to the inner electrodes,
wherein a shortest distance from distal edges of an outermost inner electrode among the plurality of inner electrodes to the first side or the second side is smaller than a shortest distance from distal edges of a central inner electrode to the first side or the second side.

2. The multilayer ceramic capacitor of claim 1, wherein the shortest distance from the distal edges of the outermost inner electrode, among the plurality of inner electrodes, to the first side or the second side is 2 to 10 μm.

3. The multilayer ceramic capacitor of claim 1, wherein a shortest distance from distal edges of a top outermost inner electrode to the first side and a shortest distance from distal edges of a bottom outermost inner electrode to the second side, among the plurality of inner electrodes are both set to be 2 to 10 μm.

4. The multilayer ceramic capacitor of claim 1, wherein the shortest distance from distal edges of the central inner electrode, among the plurality of inner electrodes, to the first side or the second side is 30 μm or less.

5. The multilayer ceramic capacitor of claim 1, wherein the shortest distance from distal edges of the central inner electrode, among the plurality of inner electrodes, to the first side or the second side is 10 μm to 20 μm.

6. The multilayer ceramic capacitor of claim 1, wherein the ceramic body includes a multilayer body in which a plurality of dielectric layers having a length forming a distance between the third side and the fourth side of the ceramic body and a width the same as that of the inner electrodes are stacked, and a first side member and a second side member forming the distance from the distal edges of the inner electrodes to the first side or the second side of the ceramic body.

7. The multilayer ceramic capacitor of claim 6, wherein the first side member and the second side member are made of ceramic slurry.

8. The multilayer ceramic capacitor of claim 1, wherein the inner electrodes include a first inner electrode of which one end is exposed to the third side and the other end is formed to be spaced apart from the fourth side by a predetermined distance and a second inner electrode of which one end is exposed to the fourth side and the other end is formed to be spaced apart from the third side by a predetermined distance.

9. A multilayer ceramic capacitor, comprising:
a multilayer body including a plurality of inner electrodes, the multilayer body having a first side and a second side opposed to each other and having a third side and a fourth side connecting the first side to the second side;
first and second side members formed on the first and second sides of the multilayer body, respectively, a width of a portion of the first side member or the second side member in contact with an outermost inner electrode being smaller than a width of a portion of the first side member or the second side member in contact with a central inner electrode; and
outer electrodes formed on the third side and the fourth side to be electrically connected to the inner electrodes.

10. The multilayer ceramic capacitor of claim 9, wherein the first side member and the second side member are individually formed from the multilayer body.

11. The multilayer ceramic capacitor of claim 10, wherein the first side member and the second side member are made of ceramic slurry.

12. The multilayer ceramic capacitor of claim 10, wherein the width of the portion of the first side member or the second side member in contact with the outermost inner electrode among the plurality of inner electrodes is about 2 to about 10 μm.

13. The multilayer ceramic capacitor of claim 10, wherein the width of the portion of the first side member or the second side member in contact with the central inner electrode is about 10 μm to about 20 μm.

14. A method of manufacturing a multilayer ceramic capacitor, comprising:
preparing a first ceramic green sheet on which a plurality of stripe-type first inner electrode patterns are formed to be spaced apart from one another by a predetermined distance and a second ceramic green sheet on which a plurality of stripe-type second inner electrode patterns are formed to be spaced apart from one another by a predetermined distance;
forming a ceramic green sheet laminate by stacking the first ceramic green sheet and the second ceramic green sheet such that the stripe type first inner electrode patterns and the stripe type second inner electrode patterns are intersected;
cutting a ceramic green sheet laminate to traverse the stripe-type first inner electrode patterns and second inner electrode patterns, to allow first inner electrodes and second inner electrodes to have a predetermined width, and to allow the ceramic green sheet laminate to have sides to which distal edges of the first inner electrodes and the second inner electrodes are exposed in a width direction thereof; and
forming a first side member and a second side member by ceramic slurry on the sides to which the distal edges of the first inner electrodes and the second inner electrodes are exposed and making a width of a portion of the first or second side member in contact with distal edges of an outermost inner electrode to be smaller than a width of a portion of the first or second side member in contact with distal edges of a central inner electrode among the plurality of first and second inner electrodes.

15. The method of claim 14, wherein the forming of the ceramic green sheet laminate is performed such that a central portion of each of the stripe-type first inner electrode patterns and a predetermined distance between the stripe-type second inner electrode patterns overlap with each other.

16. The method of claim 14, wherein the cutting of the ceramic green sheet laminate includes:
cutting the ceramic green sheet laminate into bar-type laminates, each bar-type laminate having sides to which the distal edges of the first inner electrodes and the second inner electrodes are exposed, and after the forming of the first and second side members, cutting the ceramic green sheet into multilayer bodies, each multilayer body having a third side and a fourth side to which respective one ends of the first inner electrodes and the second inner electrodes are exposed by cutting the central portion of each of the first inner electrodes and a predetermined distance between the second inner electrodes along the same cutting line.

17. The method of claim 14, wherein the cutting of the ceramic green sheet laminate is performed by cutting the ceramic green sheet into bar-type laminates, each bar-type laminate having sides to which the distal edges of the first inner electrodes and the second inner electrodes are exposed, and cutting the bar-type laminate into multilayer bodies, each multilayer body having a third side and a fourth side to which respective one ends of the first inner electrodes and the second inner electrodes are exposed by cutting the central portion of each of the first inner electrodes and a predetermined distance between the second inner electrodes along the same cutting line; and the forming of the first and second side members is performed on the multilayer body.

18. The method of claim 14, wherein the forming of the first side member and the second side member is performed by applying ceramic slurry to the sides to which the distal edges of the first inner electrodes and the second inner electrodes are exposed.

19. The method of claim 14, wherein the forming of the first side member and the second side member is performed by dipping the sides to which the distal edges of the first inner electrodes and the second inner electrodes are exposed in ceramic slurry.

20. The method of claim 14, wherein the width of the first or second side member contacting the distal edges of the outermost inner electrode, among the plurality of first and second inner electrodes is set to be 2 to 10 μm and the width of the first or second side member contacting the distal edges of the central inner electrode, among the plurality of first and second inner electrodes is set to be 30 μm or less, by controlling the amount of ceramic slurry.

* * * * *